Dec. 22, 1970 F. F. LESTER ET AL 3,549,315
COMPLEX OXIDIC COMPOUNDS AND PROCESS FOR THEIR PRODUCTION
Filed Jan. 12, 1967 5 Sheets-Sheet 1

INVENTOR
FRED F. LESTER
ARVEL O. FRANZ

Irons, Birch, Swindler & McKie
ATTORNEYS

Dec. 22, 1970  F. F. LESTER ET AL  3,549,315
COMPLEX OXIDIC COMPOUNDS AND PROCESS FOR THEIR PRODUCTION
Filed Jan. 12, 1967  5 Sheets-Sheet 3

INVENTOR
FRED F. LESTER
ARVEL O. FRANZ

ATTORNEYS

Fig. 11
Fig. 12
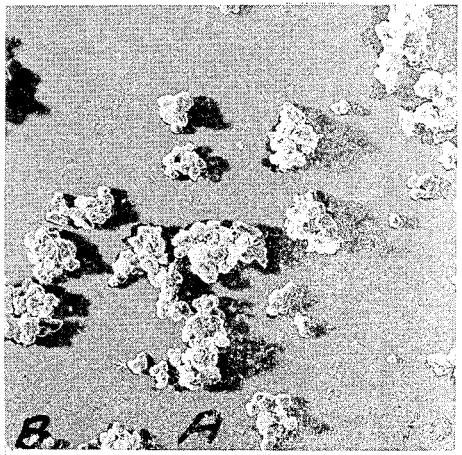
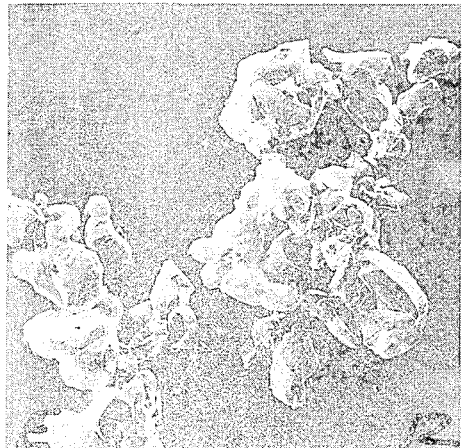
Fig. 13
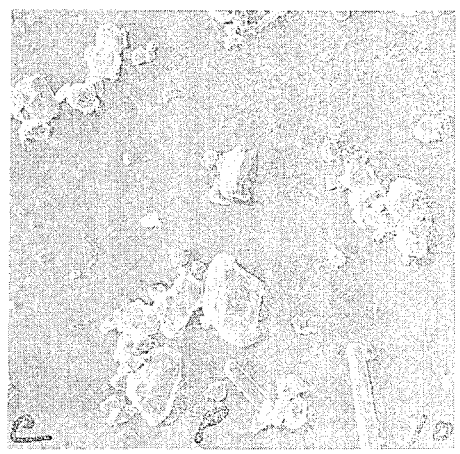

United States Patent Office 3,549,315
Patented Dec. 22, 1970

3,549,315
COMPLEX OXIDIC COMPOUNDS AND PROCESS FOR THEIR PRODUCTION
Fred F. Lester, Box 449, and Arvel O. Franz, Box 465, both of Cartersville, Ga. 30120
Continuation-in-part of application Ser. No. 149,507, Nov. 2, 1961. This application Jan. 12, 1967, Ser. No. 608,789
Int. Cl. C01f *11/00;* C22b *59/00;* C04b *35/26*
U.S. Cl. 23—51                                10 Claims

ABSTRACT OF THE DISCLOSURE

The problems associated with manufacture of complex oxidic compounds such as ferrites, titanates and the like are discussed.

---

Figure 1:
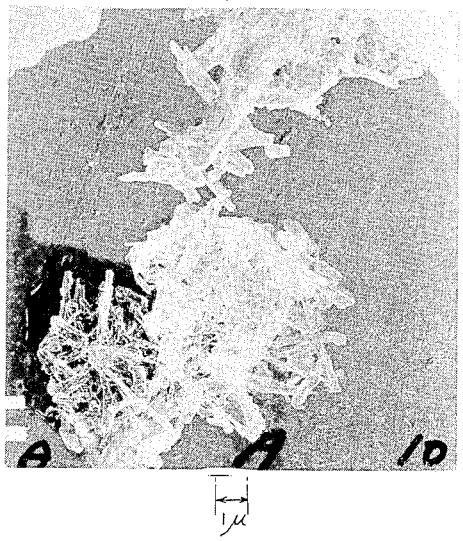

An improved method for effecting solid-solid reaction between the oxidic compounds of various metals is disclosed. By preparing deflocculated slurries of the metal oxidic compounds at high solids concentrations and dewatering the slurry, an intimate mixture of the oxidic compounds is obtained which can be reacted to provide the desired products. The superior nature of the resulting products, and particularly of the ferrites and titanates, is disclosed.

The production of magnets of unusual properties is also disclosed.

This application is a continuation-in-part of U.S. application Ser. No. 149,507, filed Nov. 2, 1961, now U.S. Pat. No. 3,322,683.

This invention relates generally to solid-solid reactions and to products including titanates and magnetic ferrites produced thereby. In partcular, this invention relates to ferrite and titanate materials produced by the solid-solid reaction of certain metalliferous compounds with ferric oxide or titanium dioxide.

In the production of the materials commonly referred to as "hard ferrites" for use in the manufacture of permanent magnets, one or more oxides and/or carbonates of alkaline earth metals and lead are reacted in the solid state with ferric oxide. To obtain useful properties in these materials, it is necessary to effect as complete a reaction as possible in such a manner so as to provide a high degree of uniformity throughout the reaction product. Accordingly, to obtain a good product, it has been found necessary to reduce the reactants to very fine particle size, produce an intimate and uniform mixture of the reactants, heat the mixture to a temperature so high in order to complete the solid-solid reaction that incipient fusion and considerable crystal growth occurs, grind the relatively large crystallites so produced to a very fine powder in which substantially all of the particles are below "domain" size, press the powders so produced (generally after the addition of binders or modifiers) at high pressure into the shape of the desired final object, and then subject the shaped object to a final firing during which substantial shrinkage and densification occurs.

It has been customary in the ferrite producing industry to mill the reactants together for many hours, as for example in ball mills or vibratory mills, usually in dilute water suspension. After drying and pressing into pellets or tablets, the firing reaction is usually carried out at a sufficiently high temperature that incipient fusion occurs, thereby taking advantage of the enhanced diffusion rate in the fluid phase. Even when these steps are so carried out, however, it is still necessary to use a substantial excess of alkali earth oxide, in order to insure that the majority of the iron oxide will be completely reacted.

The incipient fusion leads to the formation of relatively large crystals which inherently have very low intrinsic coercivity. It is therefore necessary to grind these almost sapphire hard crystals to extreme fineness. No matter how carefully this grinding operation is carried out, the resultant powder almost necessarily consists of a mixture of partciles which are too fine for optimum pressing characteristics with particles which are too coarse for optimum magnetic characteristics.

In spite of the cost and complexity of the production techniques, the fierrite magnets represent a substantial improvement over prior art magnets both in cost and properties and are attaining wide and ever-increasing use. Because of this rapidly increasing use, it is of great importance to develop processes which will produce these products at lower costs with still further improved properties.

The best ferrite magnets previously known are produced by three or more such sequential grinding and firing operations. Thus, while these are economical in comparison with many magnetic materials, they are, nevertheless, sufficiently expensive so as to be of only limited use in certain specialized applications. Moreover, the manufacturing procedures involved are wholly impractical for the production of ferrite magnets of complex configurations. It has been the general practice, in the production of ferrites of unique configurations, first to produce the magnet in the form of a bar or block and thereafter achieve the desired shape by milling or grinding operations. Because of the extreme hardness of the composition after firing, costly diamond tooling is required, and the shapes and properties which can be economically produced are severely limited.

A general object of the invention is to provide a novel method for effecting solid state reactions between highly subidivided metalliferous oxides.

It is a primary object of this invention to provide ferrites, titanates, and like materials of excellent quality at low cost.

It is a more specific object of the invention to provide a method for producing ferrite magnets which avoids the repeated grinding and heating steps of the prior art.

It is a more specific object of the invention to provide the method for accomplishing the substantially complete reaction of ferrite-forming and titanate-forming metalliferous oxides at reaction rates substantially higher than possible by techniques known to the prior art.

It is an important object of the invention to provide a low cost ferrite magnet having properties superior to previously known unoriented ferrite magnets.

It is specifically an object of the invention to provide a novel ferrite magnet which suffers no irreversible loss of magnetic strength when subjected to a low temperature, —50° F., and returned to room temperature, and which has a high intrinsic coercivity, a substantially linear B vs. H curve, a low B/H average (recoil permeability) value, and a high electrical resistance.

It is a further object of this invention to render the preparation of magnetic materials having specific properties, as for example, size or shape of particles or magnetic properties in a particular range, easier and more economical.

It is a further object of the invention to insure more complete reaction of the reactant materials, eliminating or reducing the need for excess reactants.

It is a further object of the invention to provide an improved ferrite-type magnet which can initially be economically formed in any desired shape and which is prepared by firing directly a solid mixture of the requisite metalliferous compounds, said mixture being formed by drying a high density liquid suspension thereof.

In accordance with the present invention, it is now possible to use commercially available materials wherein the particles, while being in a desirable size range, are tightly clustered in aggregates of undesirable dimensions and, by the application of simple and economical steps, reduce these to a fluid mixture in which the individual particles are not only mixed and intermingled with remarkable uniformity on a submicroscopic scale, but are also brought into closer juxtaposition with each other than has previously been possible. These reaction mixtures react more completely in a shorter time or at a lower temperature than was possible with previously known reaction mixtures and the product is inherently formed as very fine particles or crystallites. Magnets produced from the reaction mixture have a high intrinsic coercive force and a desirably lower permeability even though obtained by only a single firing of the raw materials. Further, magnets produced by these manufacturing processes are not limited only to the size and shape normally obtainable by hydraulic pressing. As a result of the inherently fine crystal size of the particles produced in accordance with the present reaction, the product can be reduced to an impalpable powder for use in plastic magnet loading compositions, or the like, by simple disruption of minor binding forces, rather than by the intensive grinding of the very hard crystals themselves.

Many fine particulate materials, either chemical precipitates, or produced by fine grinding processes, have a pronounced tendency to aggregate themselves into aggregates many times the dimensions of the individual particles. It is not known exactly what forces are involved in binding these aggregates, but they may involve residual valence forces, or attraction between adsorbed charges or ions. Regardless of the exact nature of the forces, they are recognized as being quite strong in the sense of resisting disruption of the aggregates, and dynamic, in the sense that the aggregates rapidly reform if they are disrupted. This aggregate structure is so well known that aggregates of this type are often referred to as having a "brush-heap" structure. Even when the "brush-heap" aggregates are quite firmly bound, it is almost universally true that such aggregates are quite open in structure, enclosing far more volume than the sum of the volumes of the crystallites of which they are composed. In chemical reactions involving the dissolution of such compounds, or where the chemical reactions involve materials in solution in a suspending fluid where free diffusion through this brush-heap structure is possible, the aggregate structure is of little importance. Where diffusion is not free and untrammeled (as is the case for solid-solid reactions), both the overall dimensions and the open structure of such aggregates is a decided detriment, both to the microuniformity of the reaction mix and to the freedom of contact of the reactants.

In accordance with the disclosure of U.S. Pat No. 3,322,683, an aqueous suspension of barium carbonate particles not more than two microns in size and containing not less than 65% solids by weight is prepared by mixing:

(1) a major amount of barium carbonate, having
  (a) an average particle size of from about 0.25 to about 2.0 microns as determined according to the dye absorption method, and
  (b) a "reactivity" of at least about 75%; "reactivity" being defined as the percentage of said barium carbonate which will react with an excess of calcium sulfate, present as an 80% saturated solution at room temperature, within a 24-hour period when subjected to a gentle boil under reflux;
(2) a minor amount of water; and
(3) an amount, sufficient to disperse the barium carbonate in said water but not exceeding about 2% by weight of the barium carbonate present, of a dispersant characterized by a markedly hydrophilic behavior in aqueous systems, and agitating the mixture so formed.

In addition to barium carbonate, a number of metalliferous compounds, which are substantially water insoluble and which are oxides or which yield oxides on calcining, can be similarly suspended either individually or in combination, to provide similar stable microuniform, highly fluid, high solids content compositions. Such additional compounds include specifically the insoluble oxides, carbonates, and like compounds of calcium, strontium, manganese, lead, zinc, nickel, cobalt, iron and the metals of Groups IV–B, V–B and VI–B of the Periodic Table (Handbook of Physics and Chemistry, 42nd edition, Chemical Rubber Publishing Co., [1960–1961], pp. 448–449.

Hereinafter the term "insoluble oxidic compounds" will be employed to designate compounds which exist either as insoluble oxides or as insoluble compounds which, upon calcining, yield oxides whether soluble or insoluble. It should further be noted that it is not intended to be restricted to those compounds which decompose to the oxide but also includes those which, when calcined in an oxidizing atmosphere, form the oxide.

It is possible to deflocculate the aggregated raw materials, by the application of simple physical chemical means, to the individual crystallites of which the aggregates are composed. By deflocculation it is meant that the binding force of the aggregates are destroyed or neutralized, permitting the individual particles to move freely. The deflocculated particles are permitted to assume a structure far more dense than that described above as a brush-heap structure. Further, all tendency to reaggregate is substantially destroyed.

When suspensions are formed from these various materials in the manner described above, the suspensions are substantially free of aggregates and clusters, and consist substantially entirely of particles less than 2 microns and preferably of about 1.0 to 0.5 microns in size.

In accordance with the invention, a suspension prepared as above described and comprising (a) at least one compound selected from the group consisting of the substantially water-insoluble oxidic compounds of calcium, barium, strontium, manganese, lead, zinc, nickel, and cobalt, and (b) at least one compound selected from the group consisting of the substantially water-insoluble oxidic compounds of iron, manganese and Groups IV–B, V–B, and VI–B metals, can be shaped and fired directly to the desired product. Alternatively, the mixture can be dried and fired with or without preliminary grinding to produce a powder which may be used in either the production of double-fired ceramic products or used as a loading agent for plastic bonded products.

In a more limited and preferred embodiment, an aqueous suspension is suitably prepared from:

(1) water,
(2) at least one metalliferous compound selected from the group consisting of lead oxide and the carbonates of barium, strontium, calcium and lead,
(3) at least one metalliferous compound selected from the group consisting of ferric oxide and titanium oxide, and
(4) a deflocculating dispersant for metalliferous components 2 and 3 of the reaction mixture, which deflocculating dispersant is characterized by markedly hydrophilic behavior.

While water is specified as the primary liquid component of the reaction mixture, it should be recognized that this is intended to include any dispersion fluid in which water is the principal component such that the system may be properly designated as aqueous. The aqueous liquid component comprises not over 35%, and preferably less than 25% of the final suspension.

It should be noted, of course, that in the foregoing composition, the lower oxides of iron, such as $FeO$ or $Fe_3O_4$ may be substituted for the ferric oxide. However, for the production of magnetic ferrites from such suspensions, the firing of the final product should be conducted in an oxidizing atomosphere to convert the lower iron oxide to the ferric state. It should further be noted that the corresponding nickel and/or cobalt compounds can be substituted in whole or in part for the ferric oxide to produce a ferrite-type product of altered magnetic properties. Hydroxides and oxide hydrates can similarly be used, since they will decompase to the oxides before reaching the final reaction temperature. Such hydroxides and oxide hydrates are, however, less effective for the production of the ferrite-type compounds than are the corresponding oxides and carbonates. In many instances, oxalates may be employed.

For the production of magnetic alkaline earth metal ferrites, the mol fraction of calcium compound used should be limited to a maximum of 0.4 mol fraction of the total alkaline earth metal compounds present in the reaction mixture. Lead oxide is not particularly useful for the manufacture of single fired magnets in view of its relatively high volatility; fired magnets produced using lead oxide as a component exhibit uneven shrinkage on cooling. The lead oxide does find use, however, as a doping agent to lower the reaction temperature. For uses other than in fired magnets, however, the process of the present invention is useful for the production of straight lead ferrites.

The particle size of all of the metalliferous compounds, including the ferric oxide, should be in the range of from about 2 to about 0.25 microns and preferably in the range of from about 1 micron to about 0.25 micron. The ferric oxide and metalliferous compounds of component 2 should be present in ferrite-forming proportions. Suitably, the molecular ratio of ferric oxide to metalliferous component 2 should be in the range of from about 4:1 to about 10:1. The total solids content, e.g., the combined amounts of components 2 and 3, should comprise at least 65% by weight and preferably at least 75% by weight of the total composition.

As was noted, the deflocculating dispersants are characterized by a markedly hydrophilic behavior. Such dispersants are discussed generally in U.S. Pat. No. 3,322,683. Specific operable dispersants include many conventional water softeners, such as the alkali metal and ammonium phosphates, including metaphosphates, pyrophosphates, polyphosphates, etc., the lignosulfonate soaps, the lignin-containing by-products of paper manufacture, cellulose purification and similar processes, etc. Particularly useful deflocculants are the alkali metal salts of inorganic polyphosphates such as Dequest 2006. Also useful are those anionic, cationic and nonionic surfactants which are characterized by highly hydrophilic behavior, e.g., poly (oxy) alkylenes, polyalcohols, poly (oxyalkylene) amines, amides, phosphates, thiols, alcohols, carboxylates, etc. Numerous other operable dispersants will readily occur to those skilled in the art. Accordingly, the term "dispersant" as used in this application connotes those conventional dispersants which are hydrophilic in behavior when placed in aqueous systems.

The mixture of water, reactants, and deflocculants is subjected to vigorous agitation whereby the solids are deflocculated, suspended in the water, and intimately comingled. The resulting mixture is a fluid combination of reactants suspended in water at a high solids content, the solids content being sufficiently high that the combination of solids reactants so suspended and including the volume of the water used occupy substantially less volume than that occupied by the dry solid reactants alone. Thus, for example, iron oxide as purchased, has a bulk density of about 80 pounds per cubic foot and barium carbonate has a bulk density of about 70 pounds per cubic foot. In a fluid mixture in accordance with the present invention having a solids content of about 85% by weight, the solids density is in excess of 200 pounds per cubic foot.

In the forming of solid compacted articles, e.g., from the fluid reaction mixture, the aqueous medium is separated from the solids by any one of a number of means. For example, the desired shape may be formed by extrusion, slip casting, centrifugal casting, or the like. Alternatively, the fluid mixture may be dried, the solids product crushed, granulated, or pulverized and the desired shape formed from the pulverulent material as by hydraulic or mechanical pressing or the like.

Regardless of the method used for forming the desired shaped article, the article is fired at a temperature in the range up to about 1250° C., e.g., 950° C. and higher, and perferably in the range of from 1050° to 1200° C. The time of firing will depend on the size, shape and relative dimensions of the articles, but in any event, this time will be substantially less and/or the temperature will be substantially lower than required for complete reaction of the previously known reaction mixtures. Further, the final product of this single firing step will have a substantially higher intrinsic coercivity and a desirably lower permeability than was previously possible, even with multiple fired products. It is also possible to dry the fluid reaction mixture, crush, pulverize or granulate the dried reaction mixture, and fire the resulting pulverulent material in the manner described above, but without compaction or other shaping of the material. The resulting fired pulverulent material will comprise individual crystallites of sub-domain size, i.e., substantially below 2 microns in linear dimensions.

Ferrite-forming mixtures of metallic carbonates and oxides prepared in accordance with the invention react at a remarkably high rate to substantial completeness when the mixture is dried and heated to temperatures of at least about 950° C. and preferably from about 975° to 1240° C. Normally within the temperature range specified, the reaction is complete within about 60 minutes. A reaction time of from about 60 to 100 minutes is preferred.

The speed and completeness of the ferrite reaction of the invention is illustrated by the following specific example.

EXAMPLE 1

(A) Preparation of reaction mixture in accordance with the invention 3.5 pounds of barium carbonate, having an average particle size of substantially .9 micron as determined by the dye absorption method, were mixed with an appropriate amount of water to provide an aqueous suspension containing 75% by weight of solids. Defloculation was achieved by addition of 0.2% by weight of a deflocculant sold under the tradename Dequest 2006 and described by the manufacturer, Monsanto Chemical Co., as a sodium salt of an organic polyphosphate compound containing 40% by weight of the active salt. The suspension was formed by mixing the aforementioned ingredients in a 2-gallon vessel with a ¼ horsepower Eppenbach Homo-Mixer.

FIG. 1 is an electron-photomicrograph made by the replica technique of the barium carbonate used in the preparation of the aforementioned suspension. Examination of FIG. 1 shows the barium carbonate to consist of clusters of the generally acicular crystals, crystals, each substantially less than 1 micron in diameter and several microns in length. These aggregates proved not to be dispersible by agitation in water alone.

Figure 2:
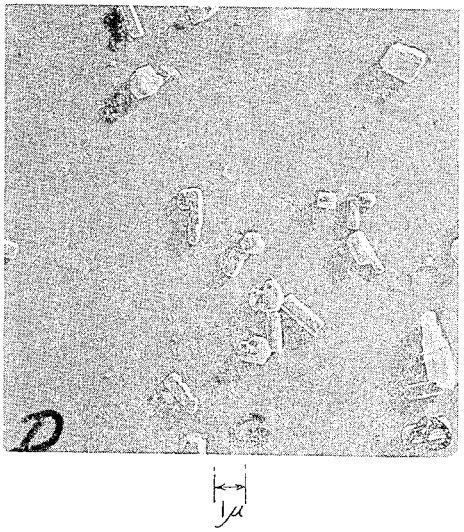

FIG. 2 is an electron-photomicrograph of barium carbonate after being suspended in water and treated with the deflocculant. Examination of FIG. 2 shows that the barium carbonate no longer consists predominantly of clusters, but is essentially in the form of discrete particles, about $1\mu$ in maximum dimension.

Sufficient water to provide a total of 7 pounds of water was then added to the barium carbonate suspension together with 0.3% by weight, based on the iron oxide, of additional deflocculant solution. To this diluted suspension was added 17 pounds, 6 ounces of Grade R,5098 ferric oxide produced by the Chas. Pfizer Company. This iron oxide was characterized by a cubical or spheroidal crystal habit with a substantial majority of the particles approximately 1 micron in size. The mixture was agitated in the manner above described for one hour.

While the use of the Eppenbach Homo-Mixer is specified in this and other examples, any high efficiency mixing or agitating device may be used provided it is suitably powered to efficiently shear the very dense and viscous fluids involved.

(B) Reaction mixture utilizing oversize barium carbonate

Figure 3:
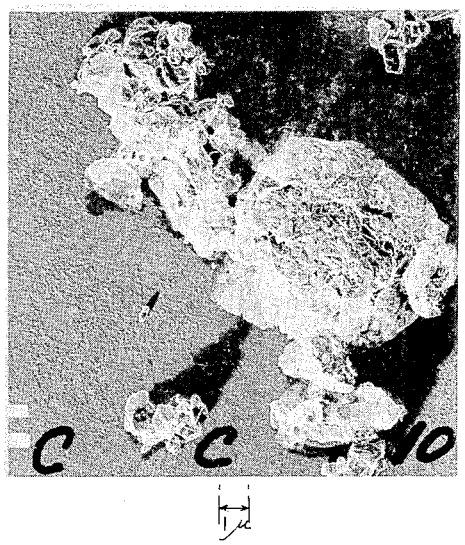

A reaction mixture was prepared using the same proportions of barium carbonate, ferric oxide, and deflocculant described in Example I–(A). In this instance, however, the barium carbonate utilized was that sold under the trade name Anti-Gyp by the Chicago Copper Company, a material widely used in the commercial manufacture of ferrites. FIG. 3 is an electron-photomicrograph of Anti-Gyp which shows it to consist of etched and distorted crystals having a particle size of from about 1 to 10 or more microns in diameter. Some of the smaller crystals appear partly deflocculated. Dye absorption indicates an average particle size of about 4.0 microns.

The suspension of Anti-Gyp and ferric oxide settled rapidly. It was necessary to maintain continuous agitation to prevent settling and segregation of the iron oxide and large barium carbonate particles.

(C) Relative reaction rates of reaction mixtures A and B

To demonstrate the speed of the reaction accomplished by the present invention, aliquot portions of each of the materials described in Example I–(A) and Example I–(B) were placed in small platinum foil containers approximately 1 cm. square and 1 mm. deep and oven dried. Each dried sample was placed in the sample position of an X-ray diffraction apparatus and surrounded by a small high temperature furnace. The X-ray diffraction apparatus was programmed to scan rapidly a small angle chosen to include a prominent line of the diffraction pattern of iron oxide and an adjacent prominent line of the X-ray pattern of barium ferrite. In each case, the furnace was raised to a reaction temperature of approximately 1000° C. (1825° F.) in about 18 minutes and maintained at this temperature by automatic controls throughout the remainder of the experiment.

The X-ray diffraction apparatus indicated, with respect to the reaction mixture of Example I–(A), that the iron oxide peak had almost completely disapeared at the end of the 18-minute time period required for the temperature of the furnace to reach 1825° F. and had completely disappeared within a total time of 45 minutes. The barium ferrite X-ray diffraction peak, however, increased for an additional 15 minutes indicating the presence of a small amount of unreacted raw material below the limit of resolution of the analysis techniques employed. After a total time of 60 minutes, no increase in the barium ferrite peak occurred. A complete X-ray diffraction pattern of the reaction product showed only the lines indicative of barium ferrite. There was no indication of unreacted barium oxide, unreacted iron oxide or of partially reacted material. The barium ferrite reaction product was black and intensely ferro-magnetic and substantially free of water-soluble barium compounds.

Figure 4:
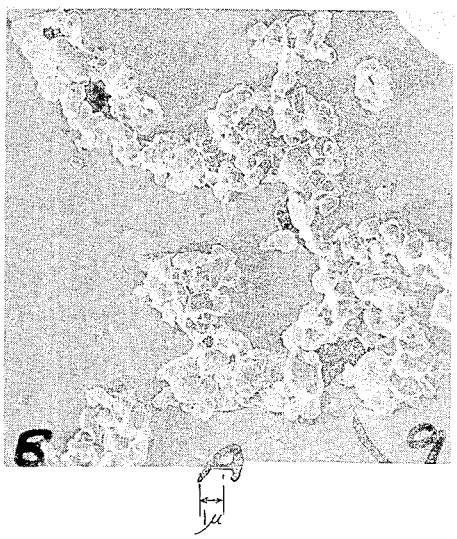

FIG. 4 is an electron-photomicrograph which shows the barium ferrite product to be composed essentially of relatively uniform substantially equant crystals generally smaller than 2 microns in size.

The X-ray diffraction apparatus indicated, with respect to the reaction mixture of Example I–(B), that only a slight diminution of the iron oxide peak had occurred and that the barium ferrite peak was just beginning to appear at the end of the 18-minute time period required to raise the furnace to the 1825° F. reaction temperature. After a 3-hour total time period, the iron oxide peak retained approximately 20% of its initial value. At this point, the furnace was turned off and a complete X-ray diffraction pattern of the product was prepared. The complete pattern was very complex. It included peaks characteristic of unreacted iron oxide, unreacted barium oxide and several intermediate compounds including apparently undecomposed barium carbonate as well as peaks indicating the presence of barium ferrite.

Figure 5:
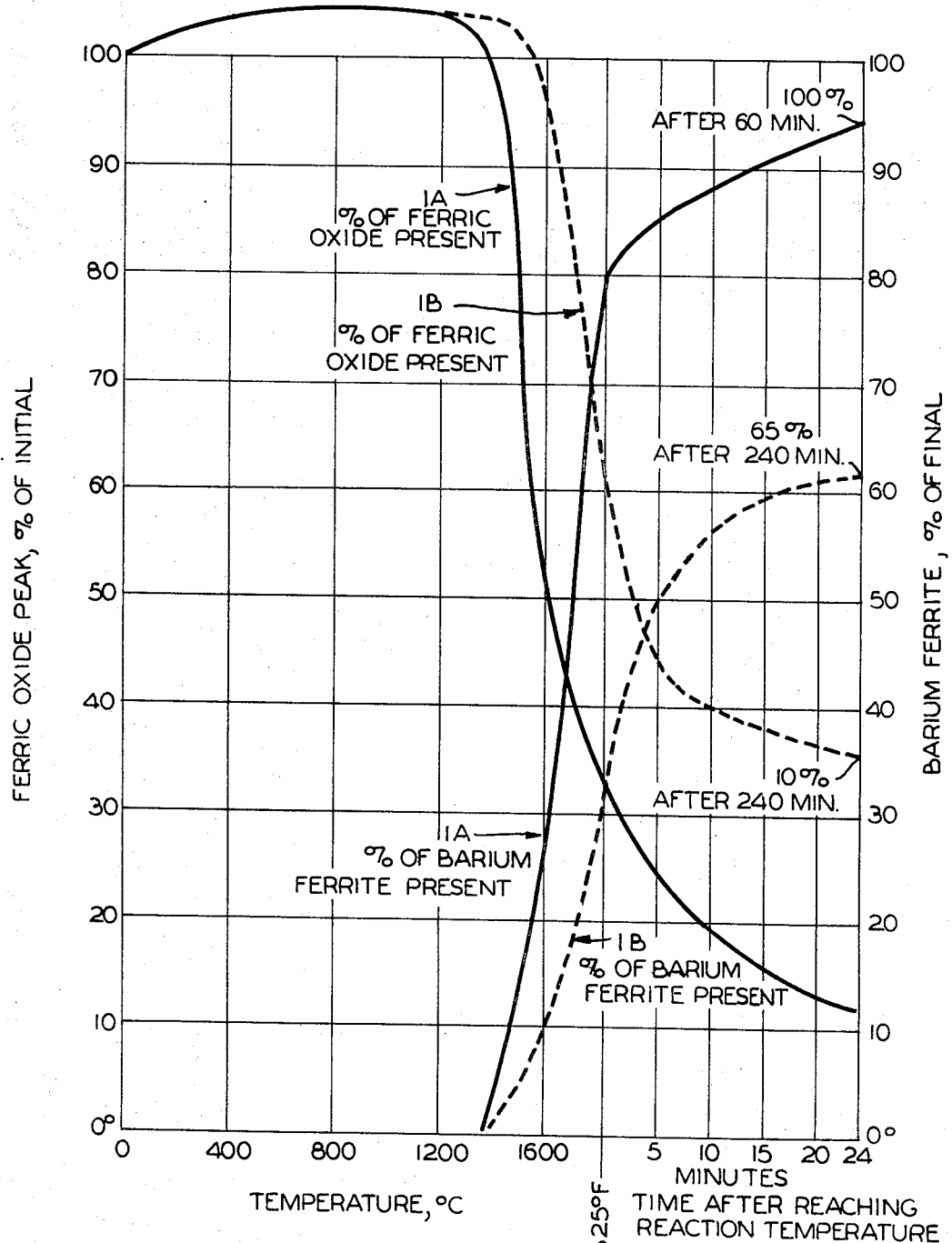

The data above described, obtained from the X-ray diffraction apparatus, is illustrated graphically in FIG. 5 and the left-hand ordinate of FIG. 5 represents the amount of ferric oxide present, while the right ordinate represents the amount of barium ferrite present. The material described in Example I–(A) is represented by the solid lines, while the broken lines represent the material described in Example I–(B). The abscissa represents temperature and time up to the reaction temperature of 1825° F. The abscissa then changes to time at the reaction temperature. The temperature is increased at a substantially uniform rate until a temperature of approximately 1825° F. is reached. The temperature is maintained at this point. The remainder of the curve represents the amount of ferric oxide and barium ferrite present at any point in time after the reaction temperature is reached. The great increase in reaction rate achieved by the process of the present invention is readily apparent.

The reaction product obtained from the reaction mixture of Example I–(B) was dark red to maroon in color, and was substantially less magnetic than the ferrite produced from the reaction mixture of Example I–(A). It reacted fairly rapidly with moisture in the air to form a whitish crust. A water suspension of the product contains soluble barium compound and was quite alkaline in reaction. The material was not considered suitable for electron-photomicrography.

The permanent magnet products of this invention are prepared by reacting a carbonate of calcium, barium, strontium or lead, or lead oxide with ferric oxide. The ferric oxide should be used in proportions requisite to provide a mol ratio in the final reaction product from about 4 to 10 mols of ferric oxide per total mol of oxide equivalent of calcium, strontium, barium and lead (calcium being a maximum of 0.4 mol fraction of the latter oxide equivalent).

Ideally, the ferrite contains exactly one molecule of the fraction designed as MeO per six molecules of $Fe_2O_3$. However, it has been generally found that an excess is required to insure that all of the iron oxide is converted to the magnetic compound. A local deficiency of only one equivalent of MeO would, at least theoretically, leave six $Fe_2O_3$ equivalents unconverted. It has been found desirable, therefore, to accept the lesser evil of having a small part of the MeO unreacted, particularly since such an excess performs usefully as a ceramic fluxing agent. When the preferred method of the present invention is employed, the need for such an excess is sharply reduced, and the process is operated with an $MeO:Fe_2O_3$ equivalent ratio in the range of 1:5.7 to 1:5.9.

The deflocculant is employed in accordance with the invention in an amount requisite to produce a stable suspension of the solids present but in no event in excess of approximately 2% of the total weight of the solids present.

Where a minor additive or doping agent is used, distribution of the additive more uniformly throughout the reaction mass reduces the amount of doping agent required and secures gerater uniformity in the desired product. Thus, where a product comprising substantially barium ferrite is desired, but control of the crystal habit is required, less than half as much lead carbonate is required with the instant process to produce results equivalent to those obtained by prior art processes. Since lead is a highly toxic material, which may be volatilized at the higher reaction temperatures and longer reaction times necessary for conventional reaction mixtures, the instant process permits a more economical and less hazardous operation.

Specifically, the ferrite magnets produced in accordance with the present invention demonstrate a high intrinsic coercivity. Moreover, in a graph of the intrinsic demagnetization curve (in which the intrinsic coercivity is the H intercept), the curve is very nearly linear over a wide range of H, resulting in a very linear B vs. H function. In a sense, this material acts as a relatively "square" hysteresis material demonstrating the maximum area under the intrinsic demagnetization curve. Accordingly, such ferrites can be utilized without irreversible loss of magnetism in extreme temperature cycles and can be employed in magnetic "circuits" in which configurations of north pole to north pole are used. Thus, stacked holding magnets or electrical motors employing stacked stator arrays can be produced.

Moreover, the magnets of the invention demonstrate a substantially linear B vs. H curve coupled with a low B/H value. Moreover, this linearity of the B vs. H curve extends to values of H substantially greater than B. As a result, these magnets can be cyclically stressed in a magnetic "circuit" without adverse effect.

Moreover, the magnetic products of the invention are remarkably uniform. Commercial samples of prior art ferrites vary in intrinsic coercivity in identical configurations as much as 30%, and 10% in strength whereas magnets properly produced in accordance with the present invention demonstrate a coercivity which does not vary more than about 2%.

In order to demonstrate that the improvement in properties and production characteristic were, in fact, related to the combination of particle size, deflocculation and density, a series of tests were run in which the composition of the material was identical and only the method of mixing was varied.

EXAMPLE II

A reaction mix wash prepared from

|  | Lbs. |
|---|---|
| Iron oxide (Chas. Pfizer 5098) | 45 |
| Dry barium carbonate | 9.94 |
| Lead carbonate | 0.94 |
| Water | 70 |

This was stirred with a propeller-type agitator for two hours. It was a very thick suspension. A Stormer viscosimeter with 450 gram weight took 65 seconds for 100 turns.

The barely fluid mixture was divided into three portions:

Sample A: dried without further treatment;
Sample B: homomixed for two hours before drying;
Sample C: ball milled for 24 hours before drying.

A small batch with similar proportions of dry ingredients was prepared in the manner previously described with the addition of Dequest deflocculant and only enough water to give 78% solids. This is designated Sample D. A Stormer viscosimeter with 100 gram weight took 43 seconds for 100 turns. Before drying, a small quantity of each of the above samples was cast in the form of a cylinder in a gypsum mold 1¼" in diameter. After drying the cylinders, they were visually examined.

Sample A was characterized as friable, low density, non-coherent, with many white specks on the fractured surface.

Sample B was friable, non-coherent, low density, with no visible specks on the fractured surface.

Sample C was friable, non-coherent, very low density, with no visible specks on the fractured surface.

Sample D was firm, solid, dense, with a few bubbles on the fractured surface, and was strong enough to handle and fire.

A portion of each sample as dried was micro-pulverized, hydraulically pressed into tablets and fired to 1200° C. with the following results:

| | Appearance | $B_{rem}$ through 0.060 gap |
|---|---|---|
| Sample: | | |
| A | Fractured, irregular, white specks | 1,000 |
| B | Cracked, pebbly, no white specks | 1,210 |
| C | Fair but slightly warped | 1,380 |
| D | Excellent, flat uniform | 1,480 |

The rod prepared from Sample D was fired, and a section cut therefrom. This rod was dense, smooth, with some bubbles, and well shrunk, and had a $B_{rem}$ of 1350.

The remainder of each portion was dried, fired in closed sagger through a push-type furnace with a total dwell of 5 hours and a maximum temperature of 1150° C. and water quenched. The water-quenched material was dried in flat pans. The dried material was examined visually.

Sample A consisted of lumps, some containing large fragments of white material. The entire surface of the dried material in the tray was covered by a whitish crust, which chemical tests showed to be a mixture of barium carbonate and hydroxide.

Sample B consisted of lumps, smooth in fracture, with some large crystals. The surface of the material in the tray showed many lumps coated with a whitish material as in Sample A.

Sample C consisted of coarsely crystalline lumps, with crystals readily visible to the naked eye. There was some whitish crust.

Sample D consisted of fine, friable lumps which were uniform in color. There were no visible crystals or whitish crust.

Sample C is considered to be the substantial equivalent of materials produced according to the prior art, while Sample D is considered to be representative of the invention. After 24 hours ball milling in a small mill, it was entirely satisfactory for the production of magnets of high strength and coercivity $$(B_{rem}0.060=1650 H_c > 1350 H_{ci}=2900)$$

while Sample C did not produce acceptable compacts even after 96 hours grinding in the small mill.

Example III, which follows, is an example of the use of the instant process with various additives to produce materials of very high intrinsic coercivity, with a substantially improved intrinsic demagnetization curve, and a low and substantially constant (even well into the third quadrant) recoil permeability. Such magnets as these are particularly desirable in magnetic circuits which can be continuously or cyclicly stressed in a strong demagnetizing field. Thus they can be used in stacked "pole-opposed" holding magnets, or electrical motors employing stacked "pole-opposed" stator or rotor arrays.

EXAMPLE III

To 7 pounds of water were added in order, 21 pounds of iron oxide (Chas. Pfizer 5098), 3 pounds of strontium carbonate (−1 micron ave. particle size) and 8¼ oz. barium carbonate, the mixture being vigorously agitated with a ¼ horsepower Eppenbach Homo-Mixer. From time to time during the additions of the solids, small portions of Dequest 2006 were added, just sufficient to keep the mixture thoroughly deflocculated at all times. At the conclusion of solids addition, sufficient additional Dequest 2006 was added to make the total 0.2% of solution (40% active ingredient) based on the total dry solids content of the mixture. The fluid mixture was stirred for one hour and divided into 4 equal portions; designated as Samples A, B, C and D. The samples were treated as follows:

(A) Dried in tumbling dryer and crushed to −16 mesh.

(B) Mixed with 1% colloidal $SiO_2$ "Quso" produced by Philadelphia Quartz Company, dried and crushed to −16 mesh.

(C) Mixed with 1% colloid $SiO_2$ "Cab-O-Sil" produced by The Cabot Corp., dried and crushed to −16 mesh.

(D) Mixed with 1% bentonite and divided into two portions:

(1) dried and crushed to −16 mesh;
(2) partially dried to extrusion consistency.

Pellets, one inch in diameter ¼″ thick were hydraulically pressed from the products obtained from Samples A, B, C and D(1). Sample D(2) was extruded through a hand extrusion press and pellets approximately one inch in diameter were sliced from the resultant extrusion.

All of the above were fired in a batch kiln for 2 hours at 1050° C. and ½ hour at 1150° C.

These materials shrank evenly on firing and without warping or distortion to produce fired magnets of fully commercial finish. Sample D2 contained bubblelike voids which were unavoidable in this simple extrusion experiment but aside from these, was dense and fully usable. It would be expected that standard vacuum extrusion techniques common to the ceramic art would eliminate these defects.

Figure 6:
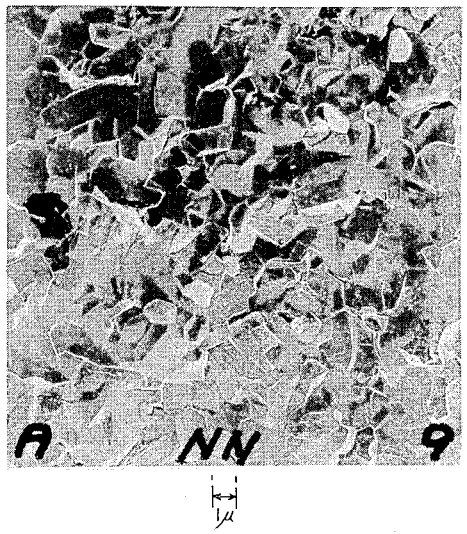
Figure 7:
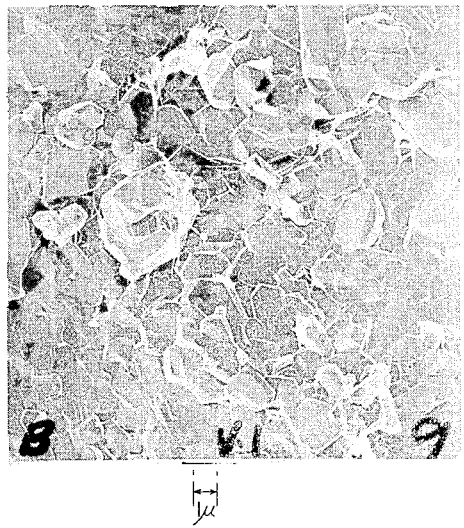
Figure 8:

The electron-photomicrograph of FIG. 6 represents a fractured surface of Sample A, while that of FIG. 7 represents Sample B. The silicate additive apparently substantially inhibited the crystal growth or twinning across boundaries. The electron-photomicrograph of FIG. 8 shows the fragmentary crystals typical of ground and refired material (a high quality commercial ferrite magnet) and shows an "island" of material which escaped the grinding process. It appears that the inherently small crystals of the present process produce a uniformity of magnetic and physical properties not attainable by conventional "fire and grind" techniques, wherein the uniformity and absence of large crystals in the magnets of the invention account for their good behavior.

Figure 9:
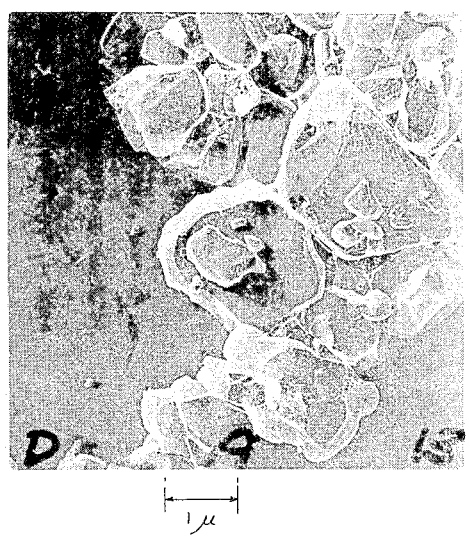

The dried material corresponding to Sample A was fired for 4 hours at 1080° C. in a tunnel kiln and micro-pulverized in a high speed hammer mill. The resultant fine powder is shown in electronphotomicrograph of FIG. 9, which clearly shows the inherently fine crystals of this material. This material was found suitable for plastic bonded magnets.

For a magnet to be effective at short overall lengths ($L/D$) less than 0.25, the permeability ($B/H$) should be as low as possible. For a magnet to be ideal in maintaining its strength in circuits where it is opposed by demagnetizing forces, the permeability should not only be low, but constant; that is, the demagnetization curve should be linear. The curve for Sample D(2) is essentially linear to the point where H equals 2000 oersteds, while like curves for prior art magnets exhibit essentially no linear portion.

When the various modifications of Example III were hydraulically pressed into magnet shape and fired to a temperature of 1180° C., magnets of high density and strength were secured. Intrinsic coercivity of Sample A was 3600 oersteds, of Sample D1, 4200 oersteds, and of Sample D2, 4800 oersteds. The physical and magnetic properties of these samples as well as a sample of prior art material (Index I) is given in Table I. Flatness was determined by comparison to a steel straight edge. Shrinkage represents a diameter or thickness after firing divided by the same dimension before firing.

TABLE I

| | Firing Results | | | | Magnetic Results | | | | |
|---|---|---|---|---|---|---|---|---|---|
| | Appearance | Flatness | Shrinkage, percent | Porosity,[1] percent | B* | H | Hci | B/H avg. | Percent loss [2] |
| A | Excellent | Good | 14.6 | 2 | 1,480 | 1,350 | 3,600 | 1.09₀ | 0 |
| B | do | do | 15.0 | 2 | 1,470 | 1,340 | 3,900 | 2.09₇ | 0 |
| C | do | do | 15.0 | 2 | 1,480 | 1,345 | 4,000 | 1.09₇ | 0 |
| D1 | do | do | 14.8 | 2 | 1,410 | 1,290 | 4,600 | 1.09₄ | 0 |
| D2 | Rough but sound | | | 9 | 1,150 | 1,080 | 4,800 | 1.07₃ | 0 |
| Index 1 | Good (pebbly) | Fair | | 3 | 1,450 | 1,150 | 3,800 | 1.26 | [3] 7 |

[1] Open porosity by weight picked up in boiling water in 24 hours.
[2] Samples were magnetized to saturation in a high flux circuit external to the permeameter and measured, then immersed in liquid ammonia (freely boiling temp. −43–45 C.) for 30 min., warmed to room temperature and remeasured.
[3] Varied widely from sample to sample. Low 6%, High 10%. Oriented samples may lose as much as 50%.
B* not a unit property, but strength in gauss measured (through a .065 gap) in the same comparable magnetic circuit for all samples. All samples cut or ground to 0.210″±.001.

Example IV, which follows, is an example of the preferred method of operation and the preferred ratio of reactants, exemplifying both the manufacture of singly fired magnets of high quality and of a ferrite powder suitable for the manufacture of doubly fired magnets or orientable magnetic materials.

EXAMPLE IV

A deflocculated slurry was prepared in the manner previously described containing:

1.65# Barium carbonate (1/120 pound mol)
1.235# Strontium carbonate (1/120 pound mol)
16.0# Ferric oxide (1/10 pound mol)
18 ml. of 40% solution of Dequest 2006
5.4# water A sample of this, when dried and pulverized and hydraulically pressed into a tablet and fired to 1200° C. showed a total shrinkage of 3.5%. Chemical analysis showed an $MeO:Fe_2O_3$ mol ratio of 1:6.0.

To the batch as described above, there was added an amount of mixed barium-strontium-carbonate sufficient to change the $MeO:Fe_2O_3$ ratio from 1:6 to 1:5.83 (about 1.5 oz.) A sample of the adjusted batch when dried, pressed and fired as above, showed a shrinkage of 17% and when tested in a standard manner, showed excellent magnetic properties.

The remainder of the batch was then dried in a rotating hot air drier. The density of the lumps of dried material was 4.3 grams/cc. or 84% of the crystal density. This indicates that the mixture had continued to densify during the drying stage until the solids content was above 90% by weight.

Three pounds of the dried batch were micro-pulverized and used in the preparation of direct fired magnets as described in Test III-A. The remainder of the batch was dried and fired as described in Test III-B for the preparation of doubly fired magnets.

Test III-A

The dried and micro-pulverized reaction mixture was used without any additives to improve pressing qualities, nor any binding agents of any kind. Portions weighing 11.5 grams were pressed in a 1″ diameter die by hand-operated hydraulic press. They were fired in a small laboratory furnace without any automatic cycle controls. The furnace was simply turned on when charged and turned off when the desired temperature was reached. Firing rate was very fast for ceramic processes, the heating rate averaging about 300° C. hour, though it was, of course, less as the maximum temperature was reached. In spite of the extremely rapid firing cycle, rarely did any sample show any shrinkage defects, cracks or irregularities, with the single exception that pellets which had been pressed at too high a pressure would show a laminar type failure easily recognized even on the unfired pellets. The fired pellets were usually rapidly cooled by opening the furnace until the interior temperature had dropped below 500° C. and then removing the tray of fired pellets. If this simple precaution was not taken, some of the pellets would break on sudden cooling. In all, the complete firing and cooling cycle was completed in less than an 8-hour cycle. The fired pellets when so pressed and fired, had excellent appearance, being flat, smooth, sharp edged and uniform in color.

Optimum firing temperature was determined by firing to several temperatures in the range from 1150° C. to 1240° C. For these undoped materials, the optimum was rather sharp, with rapid crystal growth and concomitant loss of coercivity generally setting in at temperatures over 1200° C.; samples showed lowered shrinkage with reduced loss of magnetic strength when fired at temperatures below 1150° C. Maximum values of the BH parameter were usually attained at temperatures slightly below those required to give maximum B.

A sample fired at 1170° C. from the batch of Example III was prepared by cementing two of the 11.5 gram pellets face to face and cutting a 0.5″ cube from the resultant cylinder. This sample shows a $B_{rem}$ of 2180, $B_{rec}$ of 2150, $H_n$ of 2050, $H_{i_c}$ (calculated) of 3300 and $BH_{max}$ of 1.09 MgO.

The value of reversible permeance is 1.12 gauss/oersted. The values in a direction perpendicular to the direction of pressing are substantially the same within the limit of measurement error.

The absolute value of these numbers is not, in every instance, startlingly different from values previously claimed for many commercial products. However, the straightline characteristic of the demagnetization curve, the low reversible permeance, the high value of $H_c$ and the almost identical values of $B_{rem}$ and $B_{rec}$ mark this as an almost theoretically ideal magnet, though it can be produced at a far lower cost than magnets having inferior magnetic properties.

It appears that the non-ideal behavior of conventionally produced magnets stems not from the properties of the ferrites as such, but rather from the fact that the properties as they are ordinarily measured, are the average of the properties of material of diverse particle sizes and compositions. At best, some of the material is in the form of particles too large to demonstrate the characteristic properties of truly sub-domain particle sizes. The phrase "sub-domain size" must be understood to be a definition of dimension which correlates behavior with size. A particle is said to be "sub-domain" if all of the magnetic dipoles are constrained to behave coherently. Based on this definition, the materials of the present invention exhibit an upper dimension of domain behavior on the order of about 2 microns in maximum dimension, with crystallites up to 4–5 microns showing "near-domain" behavior. The characteristic of sub-domain behavior is most easily demonstrated by the shape of the virgin magnetization curve in the first quadrant.

In contradistinction to the conventional materials, the preferred materials of the present invention contain no significant number of particles above domain size, nor does any particle suffer distortion during the firing process. Hence, in the preferred materials, the demagnetization curve approaches the theoretical ideal very closely. This, in part, is borne out by the fact that when firing is carried to such a temperature that crystal growth does start, the demagnetization chart does indeed become curved. Electron-photomicrographs also tend to verify this, those of the preferred material showing that it is composed of small and relatively uniform crystallites whose surface are bounded by planes, while those of conventional materials are of widely varying size including some few individual many microns in diameter. Further, the interstices between the particles of conventional magnets seem to be filled with material not clearly demonstrating structure of any nature.

Test III–B

A second portion of the material prepared as described above was fired or sintered in open saggers in an electrically heated "push-type" furnace with a maximum temperature of 1150° C. Total time in the furnace was 4 hours and thirty minutes. The sintered material was quenched in water immediately on removal from the furnace. This procedure renders the product far more friable and easily ground. The sinter was dried and hammer milled to break up large lumps and wet ball milled 19 hours in a one-foot diameter ball mill loaded to 60% capacity with ½″ steel balls. At the conclusion of this milling period, the product contained substantially no plus 325 mesh particles and an electron-photomicrograph showed it to be mainly crystals two microns and under in size with only slight rounding of edges and a relatively small amount of extremely fine material. The oil absorption number was nineteen. A surface area determination by the nitrogen absorption method gave a surface area per gram of 3.8 square meters corresponding to an average particle size of about 0.8 microns.

A portion of this material was pressed and fired to give the following magnetic parameters: In the direction of pressing, $B_{rem}2300$, $B_{rec}2225$, $H_c2025$, calculated $H_{i_c}3300$, reversible permeability 1.12; at right angles to the direction of pressing, $B_{rem}2100$, $B_{rec}2025$, $H_c1800$, $H_{i_c}3300$, reversible permeability 1.16. In both cases, the demagnetization curve was a straight line relationship. The difference between the values in the direction of pressing and at right angles to this direction, probably represents a certain amount of mechanical orientation which is unavoidable in all pressing operations of the prefired sinter and which renders suspect many values quoted in the literature for magnetic properties of pressed and fired magnets.

Not only do the preferred non-oriented magnets of the invention demonstrate excellent recovery of magnetic strength when subjected to a value of demagnetizing stress equal to $H_c$ but also to some value higher than $H_c$. Hence, these magnetic materials can be effectively used in extremely thin magnets, without demagnetizing themselves. In other arrays, they may be used in pole-opposed configuration to "force" magnetic flux into an armature. They demonstrate stability under low temperature environments, losing substantially none of their magnetic strength after cooling to temperatures even as low as minus 40° C., and less than 10% after cooling to minus 80° C.

The materials used should be free of soluble ionizable salts to a certain degree. The presence for example, of soluble chlorides, nitrates, sulfides or soluble (or even sparingly soluble) sulfates and possibly other water-soluble salts will inhibit deflocculation, increasing the viscosity at a given solids content and sharply limiting the total solids attainable.

It is desirable that the raw materials be free of hard cemented or sintered aggregates often present in pulverant materials dried in direct heated dryers. This is particularly a common contaminant of commercial barium carbonate, and it is preferred herein, although it is not essential, to use a pulp of the carbonate material which has not been dried.

Higher solids content mixtures may be obtained with particle sizes in the upper range of preferred dimensions, and with particles having an equant to columnar to platelike habit, but not acicular nor extremely micaceous-laminar. The most important controlling agent in the particle size of the single fired ferrite seems to be the particle size of the barium carbonate used. Iron oxide of somewhat larger average particle size than that used in the examples may be useful providing the materials are free of any substantial quantity of oversize particles.

While the system barium carbonate-strontium carbonate does not have any sharply maximized properties at any specific composition, compositions in the neighborhood of 1:1 mol ratio seem to flux at slightly lower temperatures than other compositions, while maintaining in large degree the higher strength and coercivity characteristics of strontium ferrites. A minor advantage seems to accrue in the case of mixed carbonates of barium, strontium, etc. from the use of materials that have been co-crystallized.

The use of small quantities of doping agents is readily accomplished in the present process, and even smaller quantities than are customarily used may be found to be effective. However, they must be selected, with the limits of soluble or ionizable salts in mind and should themselves be of fine particle size and preferably themselves capable of deflocculation or at least mechanical dispersion in the system. For example, the use of lead nitrate would be interdicted, while lead carbonate is very effective and crystalline lead oxides less so.

Additives for the purpose of improving pressing properties or increasing green strength of the pressed pellets likewise can be incorporated in the highly fluid reaction mixtures. Barium stearate, for example, is compatible with this mixture and functions as an excellent die lubricant and internal lubricant. In the selection of additives of this type, certain characteristics of the system must not be overlooked. At no point in the firing cycle in which a gas is being produced may there be a substantial liquid phase present, or the pellet will be disrupted. Organic binders therefore are limited to those which sublime or evaporate without decomposition, or which decompose without melting. Likewise, inorganic binders must not have a melting point at or below the temperature at which carbon dioxide is being evolved in the primary reaction of the barium carbonate. For example, this requirement interdicts the use of low-melting lead silicates as doping agents in single fired magnets. Polyvinyl pyrrolidone of low molecular weight is a satisfactory binder and good quality bentonitic clays may function both as green strength binders and crystal growth control agents. The use of bentonite is desirably limited to quantities below ½% since larger quantities undesirably increase the viscosity of the fluid mixture and undesirably dilute the magnetic properties.

The following example describes the production of material treated with minor quantities of additives to produce a compounded ferrite product suitable for the preparation of magnetically oriented materials of superior properties.

EXAMPLE V

A deflocculated slurry was prepared in the manner previously described containing:

3.35 lbs. barium carbonate
0.25 lbs. lead carbonate
16.0 lbs. iron oxide (Chas. Pfizer #R5098)
10 grams bentonitic clay
5.0 lbs. water The MeO:Fe$_2$O$_3$ ratio of this composition is 1:5.75, due allowance being made for the impurities present in the raw materials. A sample of this composition, when dried, pressed and fired as a single fired magnet to a temperature of 1200° C. showed 16% shrinkage and excellent strength and coercivity relationships. The remainder of the batch was dried in a rotating drier. A moisture determination made on a lump portion of material which had been partially dried but still demonstrated flow properties indicated a solids content of over 90% by weight.

Figure 10:
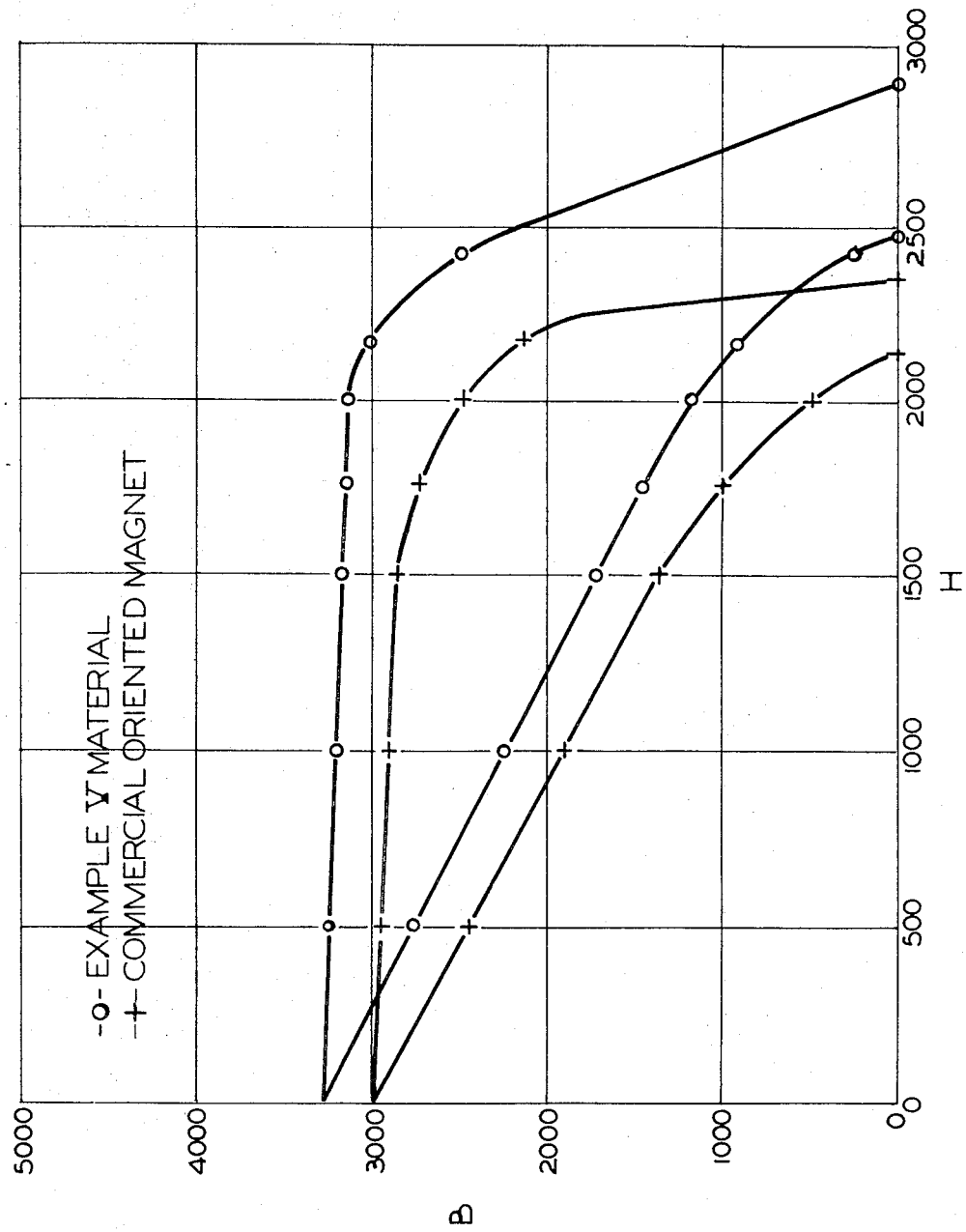

The dried lumps of this material were fired in saggers in a push-type furnace with a total dwell time of 5.5 hours and a maximum temperature section maintained at 1125° C. The fired material was permitted to cool slowly. The hard lumps so produced were autogenously ball milled. The product of autogenous milling contained only a trace of +325 mesh material. It was wet screened through a standard 325 mesh screen and used in the preparation of magnetically oriented compacts in known manner. When these compacts were dried and fired to 1200° C. and cooled and magnetized and compared with the best commerical oriented ceramic magnets available (of a similar leaded comp.), they were found to be superior, not only in strength, but also in demagnetization characteristics. FIG. 10 is a plot of the magnetic behavior of this material in comparison with a high grade commercial magnet of the oriented type. These properties are measured in a permeameter having a gap of 0.060" in the magnetic circuit. Such a permeameter represents the magnetic behavior in a motor circuit far more accurately than does the customary closed circuit device. It is noteworthy that not only is the initial strength of our magnet higher, but that the reversible permeability is desirably lower (approaching unity very closely) and the coercivity higher, and that these desirable properties were attained by magnetic orientation of a water slurry rather than an alcohol suspension and from a powder produced without the long and costly preparative and grinding processes of prior art materials.

The very high solids content fluid reaction mixture lends itself ideally to spray drying and when so dried, forms high density spherulent pellets admirably suited for production pressing or other fabrication techniques.

The very high solids fluid reaction mixture further lends itself to a wide variety of production techniques familiar to the ceramic industry. For example, it can be slip cast, centrifugally cast, extruded, jiggered, isostatically pressed and the like. The green objects so produced if they are free of bubbles or large void will be found to have densities as high as or higher than those of hydraulically pressed items and will fire with uniform shrinkage. By these techniques, large irregular or complexly shaped magnets can be produced at low cost. It is to be understood, of course, that in the use of such techniques, skills and arts of drying and firing well known in the ceramic industry must be applied to eliminate cracking and warping.

In the manufacture of barium titanate, it is important that the composition of the mixture be adjusted to precise BaO:TiO$_2$ ratios to insure the obtaining of the desired modification; however, these ratios may be varied slightly depending on the end use of the product, i.e., whether it is to be used for capacitors, for piezoelectric materials or for high voltage insulating materials. Since such factors as high frequency loss, piezoelectric properties and leakage currents are dependent on the uniformity of each crystal, it is quite important that mixing of the reagents on a micro-uniform scale be practiced. The difficulty of this operation is well known in the industry. It is common practice to sort and classify finished batches for end use, and to furnish preshipment samples to customers for their selection. The ease of securing micro-uniform mixtures of raw materials by the method of the present invention provides not only high reaction speeds and production of intrinsically fine particles, but also production of material having a very high degree of particle-to-particle uniformity. The following example demonstrates the utility of the process for reactions of this type.

EXAMPLE VI

Thoroughly deflocculated barium carbonate was obtained by mixing 5.77 pounds of wet barium carbonate filter cake with 5 ml. of a 40% aqueous solution of Dequest 2006 in an Eppenbach Homo-Mixer stirrer. The filter cake contained 62.3% by weight solids analyzing 99.1% barium carbonate and was equivalent to 3.56 pounds of pure barium carbonate.

To this deflocculated barium carbonate was added 1.44 pounds of commercially pure titanium dioxide having an average particle size of 0.3 micron. The titanium dioxide was in the rutile form as shown by X-ray diffraction pattern. The titanium dioxide dispersed readily to give a relatively fluid slurry containing 78.1% total solids.

This material was dried and a small sample placed on the hot stage of an X-ray diffraction apparatus set to scan repeatedly a short range of angles containing a major line of the barium carbonate pattern, the rutile pattern and the expected barium titanate pattern. The heat was then turned on and the temperature increased over a period of ten minutes to 1825° F. Before this temperature was reached, the $BaCO_3$ and $TiO_2$ peaks had started to decrease, the peak characteristic of $BaTiO_3$ was quite high. A peak characteristic of the compound $Ba_2TiO_4$ (barium orthotitanate) appeared in the early stages of the reaction, later disappearing almost completely. At the end of ten additional minutes, the peaks characteristic of $TiO_2$ and $BaCO_3$ had completely disappeared.

A complete X-ray diffraction pattern at high resolution showed that the product was composed almost entirely of $BaTiO_3$ in the cubic modification with a minor amount of barium orthotitanate. This cubic modification is normally stable only at temperatures above the Curie point and when found as the stable structure at room temperatures, it indicates the existence of extremely small or subdomain crystal structure. As shown in the electron-photomicrograph of FIG. 11, the friable pulverant product of this reaction shown is composed of small aggregates of very small crystals.

EXAMPLE VII

Example VI was repeated using crystalline barium carbonate having an average size measured according to the dye adsorption method of approximately 4 microns. In this case, the barium carbonate and titanium dioxide peaks were only slightly reduced during the heating-up period, and did not disappear in more than thirty additional minutes at the reaction temperature. The barium orthotitanate structure persisted throughout the heating period. The high resolution X-ray diffraction pattern showed patterns of both the cubic and tetragonal forms, with substantial admixtures of unreacted barium carbonate and titanium dioxide, as well as barium orthotitanate and a material tentatively identified as a tri-barium titanate. The electron-photomicrograph of FIG. 12 shows the product to be composed of aggregates of substantially larger particle size than obtained in Example VI though still quite small.

For comparison, both high resolution X-ray diffraction patterns and electron-photomicrographs were prepared of two commercial lots of barium titanate, one of condenser grade and one of piezoelectric grade. The X-ray diffraction patterns show that both of these materials are in the tetragonal form and contain substantial quantities of barium orthotitanate. The electron-photomicrographs additionally show both of these materials to be relatively large fragments of crystals probably produced by grinding of coarse crystalline material. FIG. 13 is the photomicrograph of the piezoelectric grade material. The condenser grade material had essentially the same appearance.

It is recognized that for some purposes, the presence of even traces of phosphates may be undesirable. In these cases, organic deflocculants can be chosen from the effective types previously described. Ammonium polyacrylate has been found particularly effective for the titanate compositions.

The ceramic-type compounds which can be prepared by the present process, or obvious variations thereof, include barium zirconate, barium niobate, barium tungstate, barium lead zirconate, barium strontium zirconate, lead zirconate, lead titanate, calcium salts of corresponding structure, mixed ferrites, barium manganese ferrites, nickel zinc ferrites and the like.

In many cases, the preparation of these compounds by methods previously available to the art, even when the reactants are intensively ball milled together, can only be carried out at excessively high temperature, by the use of a substantial excess of one of the reactants or in the presence of a flux. Strontium titanate, for example, is extremely difficult to prepare, since its reaction temperature as normally prepared, is above the point at which it becomes non-stoichiometric with respect to oxygen.

Barium zirconate is relatively difficult to prepare because zirconium dioxide is normally available in either a relatively coarse and dense form which is nonreactive, and a relatively fine form from which it is very difficult to produce dense reaction mixtures. The present process permits desirable reaction rates with both of these forms.

Where small quantities of doping agents are desired, these agents may be co-crystallized with one of the reactants, thereby producing finished products which are truly mixed crystals, rather than mixtures of diverse crystals. For example, in the preparation of titanates, many finished compositions involve the admixture of barium titanate 90%, strontium titanate 5%, calcium titanate 5%. If this mixture is prepared from co-crystallized barium-strontium-calcium carbonate (in the range of a true solid solution), the resulting titanate will possess a degree of uniformity not otherwise obtainable.

Throughout the body of this specification, the quality aspects of the invention have been emphasized. The economic consequences of the operation of the invention are also of great importance. By operating in the preferred manner, very large quantities of reaction mix can be prepared in very small vessel, with a minimum of labor cost and power expenditure. For example, it is possible to prepare 10,000 pounds dry weight of reaction mix in a 500 gallon vessel in not over 4 hours total time, and with the use of less than 160 kilowatt hours of power. The drying of this mixture involves the evaporation of only 2500 pounds of water. When operating in the conventional manner at 30% solids, the mixing vessel alone would require a volume of about 4000 gallons, while ball mills, if used, would require at least 4 times that volume. Moreover the drying of such a mixture would involve the evaporation of 23,000 pounds of water. Moreover, some form of pelletizing or densification of the reaction mix is necessary in the conventional process, whereas the reaction mix of the invention is of adequate density as dried. Further, the greater rapidity of reaction inherent in the process of the invention further reduces the size of kiln required, while the ease of grinding to domain size sharply reduces the size and power requirement of the final grinding stages.

What is claimed is:
1. A process for producing mixed metal oxide products comprising the steps of
   (1) mixing in an aqueous medium
      (a) at least one compound selected from the group consisting of the substantially water-insoluble oxidic compounds of calcium, barium, strontium, manganese, lead, zinc, nickel and cobalt;
      (b) at least one compound selected from the group consisting of the substantially water-insoluble oxidic compounds of iron, manganese and Group IV–B, V–B and VI–B metals; and
      (c) a deflocculating dispersant for compounds (a) and (b) which is characterized by markedly hydrophilic behavior, said dispersant being present in an amount, sufficient to disperse compounds (a) and (b) in said medium, but not exceeding about 2% by weight of the total weight of compounds (a) and (b) present,
   the amount of compound (a) being at least about stoichiometric with respect to the reaction of compound (a) with compound (b), the aggregate of compounds (a) and (b) comprising at least 65% by weight of the total aqueous mixture whereby a deflocculated aqueous suspension of high solids content is obtained;

(2) separating the aqueous medium from the solids, and
(3) firing the solid residue at an elevated temperature until reaction between compounds (a) and (b) is substantially complete.

2. A process in accordance with claim 1 wherein compound (a) is selected from the group consisting of lead oxide and the carbonates of barium, strontium, calcium and lead, compound (b) is ferric oxide having a size in the range of from about 2 to about 0.25 microns and wherein the molecular ratio of ferric oxide to said selected compound is in the range of about 4:1 to about 10:1.

3. A process in accordance with claim 2 wherein the solid residue of step (2) is fired at a temperature in the range of about 950 to 1250° C.

4. A process in accordance with claim 3 wherein the dispersed solids are formed into a desired shape during step (2).

5. A process for producing barium ferrite comprising
(1) preparing an aqueous suspension of barium carbonate and ferric oxide; said barium carbonate and ferric oxide having particle sizes in the range of from 2 to about 0.25 microns; the molecular ratio of ferric oxide to barium carbonate being in the range of from about 4:1 to about 10:1; and the aqueous suspension comprising at least 65% by weight solids;
(2) deflocculating the aqueous suspension of barium carbonate and ferric oxide by addition of an amount of hydrophilic dispersant sufficient to disperse the barium carbonate and ferric oxide, in the suspension, said amount not exceeding about 2% by weight of the total weight of said barium carbonate and ferric oxide in said suspension;
(3) agitating the resulting mixture;
(4) drying the resulting mixture, and
(5) firing the solid residue at a temperature of from 950° to 1250° C. until the formation of barium ferrite is substantially complete.

6. The method of producing a shaped body capable of being magnetized into a permanent magnet, comprising:
(1) preparing an aqueous suspension of ferric oxide and at least one metalliferous component selected from the group consisting of calcium, barium, strontium and lead oxides, and substantially water-insoluble compounds of calcium, barium, strontium and lead which yield oxides upon calcining; the molecular ratio of ferric oxide to metalliferous component being about 4:1 to about 10:1; when the metalliferous component comprises a calcium compound, the mol fraction of the calcium compound not exceeding 0.4 of the total metalliferous component, the aggregate of the ferric oxide and the mealliferous component comprising at least about 65% by weight of the total suspension;
(2) deflocculating the aqueous suspension of barium clusion of a sufficient amount of a hydrophilic dispersant to disperse said oxide and said component in said suspension, said amount not exceeding about 2% by weight of the total weight of the solids present in said suspension;
(3) agitating the resultant mixture;
(4) drying the aqueous mixture;
(5) pulverizing the resultant dry residue;
(6) forming the resulting powder into a shaped body; and firing the shaped body.

7. A process for producing barium titanate comprising
(1) mixing in an aqueous medium barium carbonate, titanium dioxide and a deflocculating dispersant for barium carbonate and titanium dioxide which is characterized by markedly hydrophilic behavior, said barium carbonate and titanium dioxide being present in said suspension in about equal molecular proportions and the aggregate of barium carbonate and titanium dioxide comprising at least 65% by weight of the total aqueous mixture, said dispersant being present in an amount sufficient to disperse said barium carbonate and titanium dioxide in said medium, said amount not exceeding about 2% by weight of the total weight of solids present in the suspension, whereby a deflocculated aqueous suspension of high solids content is obtained;
(2) separating the aqueous medium from the solids; and
(3) firing the solid residue at an elevated temperature until the reaction between barium carbonate and titanium dioxide is substantially complete.

8. A barium ferrite product produced in accordance with the process of claim 2 and consisting essentially of sub-domain size crystals produced by the single firing of a deflocculated mixture of components having a bulk density very substantially in excess of the individual bulk densities of the mixture components.

9. A barium ferrite magnet consisting essentially of a shaped magnetized mass of the barium ferrite product of claim 8 and characterized by freedom from irreversible loss of magnetic strength at temperatures below −50° F. and further characterized by a substantially linear B vs. H curve.

10. A process for producing mixed metal oxide products comprising the steps of
(1) mixing in an aqueous medium
   (a) at least one compound selected from the group consisting of the substantially water-insoluble oxidic compounds of calcium, barium, strontium, manganese, lead, zinc, nickel and cobalt;
   (b) at least one compound selected from the group consisting of the substantially water-insoluble oxidic compounds of iron, manganese and Groups IV–B, V–B and VI–B metals; and
   (c) a deflocculating dispersant for compounds (a) and (b) which is characterized by markedly hydrophilic behavior, said dispersant being present in an amount, sufficient to disperse compounds (a) and (b) in said medium, but not exceeding about 2% by weight of the total weight of compounds (a) and (b) present,
the amount of compound (a) being at least about stoichiometric with respect to the reaction of compound (a) with compound (b), the aggregate of compounds (a) and (b) comprising at least 65% by weight of the total aqueous mixture whereby a deflocculated aqueous suspension of high solids content is obtained, said compounds (a) and (b) each having a particle size within the range of from about 2 to about 0.25 microns;
(2) separating the aqueous medium from the solids; and
(3) firing the solid residue at an elevated temperature until reaction between compounds (a) and (b) is substantially complete.

References Cited

UNITED STATES PATENTS

| | | | |
|---|---|---|---|
| 2,218,655 | 10/1940 | Peterson | 23—51 |
| 2,762,778 | 9/1956 | Gorter et al. | 23—51 |
| 2,805,165 | 9/1957 | Goodman | 23—51X |
| 2,948,628 | 8/1960 | Wainer | 23—51X |
| 3,292,994 | 12/1966 | Kiss et al. | 23—51 |
| 3,331,659 | 7/1967 | Malloy | 23—51 |
| 3,330,697 | 7/1967 | Pechini | 23—51(UX) |
| 3,442,668 | 5/1969 | Fenerty et al. | 106—39 |

FOREIGN PATENTS

| | | | |
|---|---|---|---|
| 569,081 | 1/1959 | Canada | 23—51 |

HERBERT T. CARTER, Primary Examiner

U.S. Cl. X.R.

23—20, 22; 106—39; 252—62.9, 62.59, 62.63, 62.64, 63.5; 264—56, 63

UNITED STATES PATENT OFFICE
CERTIFICATE OF CORRECTION

Patent No. 3,549,315          Dated December 22, 1970

Inventor(s) Fred. F. Lester and Arvel O. Franz

It is certified that error appears in the above-identified patent and that said Letters Patent are hereby corrected as shown below:

Column 2, Line 34: Delete "subidivided", and insert -subdivided-

Column 4, Line 1: Delete "carhonate", and insert -carbonate-

Column 5, Line 8: Delete "decompase", and insert -decompose-

Column 8, Line 69: Delete "gerater", and insert -greater-

Column 11, Line 66: Delete ")" appearing after L/D

Column 19, Line 56: Delete "of barium" and insert -by the in- -

Signed and sealed this 15th day of June 1971.

(SEAL)
Attest:

EDWARD M. FLETCHER, JR.           WILLIAM E. SCHUYLER, JR.
Attesting Officer          Commissioner of Patents